(12) United States Patent
Gilmour

(10) Patent No.: US 8,498,205 B2
(45) Date of Patent: Jul. 30, 2013

(54) SYSTEM AND METHOD FOR MONITORING A PLURALITY OF NETWORK DEVICES

(75) Inventor: Grant James Gilmour, Calgary (CA)

(73) Assignee: Lexmark International, Inc., Lexington, KY (US)

( * ) Notice: Subject to any disclaimer, the term of this patent is extended or adjusted under 35 U.S.C. 154(b) by 167 days.

(21) Appl. No.: 13/036,905

(22) Filed: Feb. 28, 2011

(65) Prior Publication Data

US 2011/0213848 A1    Sep. 1, 2011

Related U.S. Application Data

(63) Continuation of application No. 12/258,504, filed on Oct. 27, 2008, now Pat. No. 7,920,467.

(51) Int. Cl.
*G01R 31/08*    (2006.01)

(52) U.S. Cl.
USPC .......................................................... 370/229

(58) Field of Classification Search
USPC ................ 370/229, 230, 235, 236, 254, 255, 370/265, 257; 709/244, 223, 220, 221
See application file for complete search history.

(56) References Cited

U.S. PATENT DOCUMENTS

| | | | | |
|---|---|---|---|---|
| 7,545,748 | B1* | 6/2009 | Riddle | 370/235 |
| 7,920,467 | B2* | 4/2011 | Gilmour | 370/229 |
| 2001/0004361 | A1* | 6/2001 | Kobayashi | 370/401 |
| 2005/0076054 | A1* | 4/2005 | Moon et al. | 707/103 Y |
| 2007/0189166 | A1* | 8/2007 | Johnson et al. | 370/230 |
| 2008/0171552 | A1* | 7/2008 | Hyon et al. | 455/450 |
| 2008/0246988 | A1* | 10/2008 | Ashton | 358/1.15 |
| 2009/0201844 | A1* | 8/2009 | Bhatti et al. | 370/312 |
| 2010/0014424 | A1* | 1/2010 | Agrawal et al. | 370/235 |
| 2010/0057907 | A1* | 3/2010 | Ross et al. | 709/224 |
| 2010/0103824 | A1* | 4/2010 | Gilmour | 370/245 |

\* cited by examiner

*Primary Examiner* — Fan Ng

(57) ABSTRACT

A system for monitoring a plurality of network devices within a network comprises a network monitor embedded within one of the network devices for automatically discovering and requesting status information from other network devices. The network monitor, in the event that another network monitor is discovered, initiates cooperation with the other network monitor to share discovering and requesting.

20 Claims, 2 Drawing Sheets

SYSTEM AND METHOD FOR MONITORING A PLURALITY OF NETWORK DEVICES

This application claims benefit and priority as a continuation of pending U.S. patent application Ser. No. 12/258,504, entitled "SYSTEM AND METHOD FOR MONITORING A PLURALITY OF NETWORK DEVICES"; having a filing date of Oct. 27, 2008 now U.S. Pat. No. 7,920,467.

FIELD OF THE INVENTION

The present invention relates generally to computer networks and particularly to a system and method for monitoring a plurality of network devices.

BACKGROUND OF THE INVENTION

Local area networks (LAN's) and wide area networks (WAN's) are typically comprised of many interconnected network devices, such as printers and/or other peripherals. It is useful to continuously monitor the status of the network devices in order to ensure the network devices are functioning as desired. During monitoring of printers, information pertaining to the operational status of the printers is provided by each printer to a host computer in the network, typically upon periodic or scheduled prompting or query by the host computer. The operational status information can comprise information such as printer name, MAC address and/or an identifying serial number, low toner indicator status, and offline indicator status, current page count, etc.

To carry out the monitoring, prompting for operational information, and overall operational coordination of the printers, monitoring software is installed on the host computer. In general, the monitoring software performs these functions by: i) discovering printers; ii) monitoring the printers; iii) uploading collected information to an external collector; iv) reporting collected information; and v) permitting viewing of collected information.

During discovery, under control of the monitoring software, the host computer searches a preconfigured list of TCP/IP addresses for printers capable of making a Simple Network Management Protocol (SNMP) connection or Line Printer Daemon (LPD) connection. The host computer then attempts to extract data from each printer via known SNMP DID ("object identifier") data requests (e.g. HP, LINKSYS, IEEE, DLINK, etc) to establish a method by which subsequent extraction of information from the printers is to be performed. With the extraction method established, a series of device parameters is then extracted from the printer according to the method, the exact parameters depending on the type of print server embedded in the printer (e.g. print engine manufacturer, serial number, device supplies such as toner level or remaining paper count, and counters/meters for the printer). Where the needed data cannot be provided using SNMP extraction, the monitoring software interrogates the printer device over TCP/IP ("Transmission Control Protocol" and the "Internet. Protocol") using HTTP ("Hypertext Transfer Protocol"). The scope of the data attainable by this second method is typically more limited, but can include printer serial number, counters/meters, and device supplies, such as toner level and remaining paper count. In the event that both the SNMP and HTTP methods fail to provide the requested data, a Printer Job Language (PJL) interrogation protocol over TCP/IP may be employed.

During monitoring, the host computer interrogates the monitored printers on a regular/scheduled interval to update stored parameters and to check for status and/or supplies changes. Device status changes may also initiate an interrogation when SNMP traps (i.e. notification sent by the monitored device to the monitoring device without being prompted) are employed. Printer state changes (e.g. up, down, idle, printing, warning, etc.) and toner cartridge levels are monitored in order to provide notifications where desired, and historical data is gathered over time and used to determine if the cartridge has been changed or if an operator has manipulated the cartridge to extend the toner life on an existing cartridge. The host computer also detects and logs printer exchanges at a monitored IP address, and can track a printer continuously even if it is moved to a different IP address. Print, copy, scan and fax volumes undertaken by a printer are calculated by tracking meters/page counts over a period of time. The host computer e-mails alerts in the event of a change in printer status, if it is unable to contact the printer via TCP/IP, if supplies level drops below a specified level, and for other events.

During uploading to an external data collector, data captured during the discovery phase and updated during the monitoring phase is encoded into a proprietary encrypted format and transferred using HTTP/HTTPS over TCP/IP to an external server-based data collector.

During reporting, data from the internal data storage may be aggregated and reformatted into a variety of viewing formats, such as a comma separated value (CSV) format or an Extensible Markup Language (XML) format. A user may view the aggregated data using an HTML display on the data collector's internal web server or via a web server in the bundle.

While the above process is effective, the use of a separate host computer on which the monitoring software is run introduces an extra level of complexity to administration of the network. For example, the end user of one or more printers in a network, for example a company or corporation, bears the responsibility of installing and maintaining updates for the monitoring, software on a designated and networked host computer. The cost of the heist computer adds significantly to the overall cost of the network, and yet it is possible that the host computer could be disconnected from the network or otherwise fail to provide the desired monitoring services at one time or another. It is therefore an object of the present invention to provide a simplified monitoring system and method that does not rely on a host computer.

SUMMARY OF THE INVENTION

According to an aspect, there is provided a system for monitoring a plurality of network devices within a network, comprising: a network monitor embedded within one of the network devices for automatically discovering and requesting status information from other network devices; wherein the network monitor, in the event that another network monitor is discovered, initiates cooperation with the other network monitor to share discovering and requesting.

According to another aspect, there is provided a method performed by a network monitor for monitoring a plurality of network devices within a network, comprising: discovering network devices and other network monitors within the network; cooperating with one or more other discovered network monitors to coordinate sharing of the monitoring; and based on the coordinating, periodically requesting status information from certain of the discovered network devices thereby to monitor the network devices.

According to yet another aspect, there is provided a computer readable medium embodying a computer program for a network monitor for monitoring a plurality of network devices within a network, the computer program comprising: program code for discovering network devices and other network monitors within the network; program code for cooperating with one or more other discovered network monitors to coordinate sharing of the monitoring; and program code for, based on the coordinating, periodically requesting status information from certain of the discovered network devices thereby to monitor the network devices.

According to another aspect, there is provided a system for monitoring a plurality of network devices comprising: at least two devices, the devices being in communication with each other through a network, at least one of the devices having embedded instructions for monitoring the devices.

According to another aspect, there is provided a method for monitoring devices on a network, comprising the steps of: identifying devices on the network capable of making an SNMP connection; requesting identification data from each of the identified devices, wherein the requesting uses one or more of SNMP, HTTP, XML, ICMP, and PJL over TCP/IP; storing the device identification data received in response to the requesting; periodically requesting additional data froth devices using the stored device identification data and, if the additional data satisfies a predetermined criterion, creating and sending an electronic message to at least one specified recipient; connecting directly into any identified external device; forwarding information collected on a scheduled basis to an external collector; and coordinating the identifying and the requesting of multiple monitoring systems on a network; all of the steps originating from instructions embedded within at least one network device.

According to still another aspect, there is provided a method of coordinating at least two devices on a network having a plurality of devices to monitor and manage the plurality of devices, the at least two devices each having embedded instructions for carrying out the steps of identifying devices on the network capable of making an SNMP connection; requesting identification data from each of the identified devices, wherein the requesting uses one or more of SNMP, HTTP, XML, ICMP, and PJL over TCP/IP: storing the device identification data received in response to the requesting; periodically requesting additional data from devices using the stored device identification data and, if the additional data satisfies a predetermined criterion, creating and sending an electronic message to at least one specified recipient; connecting directly into any identified external printing device; forwarding information collected on a scheduled basis town external collector; and coordinating the identifying and the requesting of multiple monitoring systems on a network.

Described herein is a system in which one or more network monitors for the monitoring of network devices and embedded within a respective network device, provide network discovery, monitoring, and reporting capability to end users with little or no dedicated configuration. Preferably, a network monitor is embodied as monitoring software comprised of computer readable program code embedded within a respective network device. In this system, no dedicated host computer is required, and thus monitoring of network devices is made simpler and more efficient than in prior systems. By embedding the monitoring software within a network device such as a printer, monitoring software delivery, execution and configuration are also greatly simplified. For example, much or all of the configuration is performed while the network device itself is configured for e-mail setup, network setup, contact information, and so forth.

BRIEF DESCRIPTION OF THE DRAWINGS

Embodiments will now be described more fully with reference to the accompanying drawings in which.

DETAILED DESCRIPTION OF THE EMBODIMENTS

Figure 1:
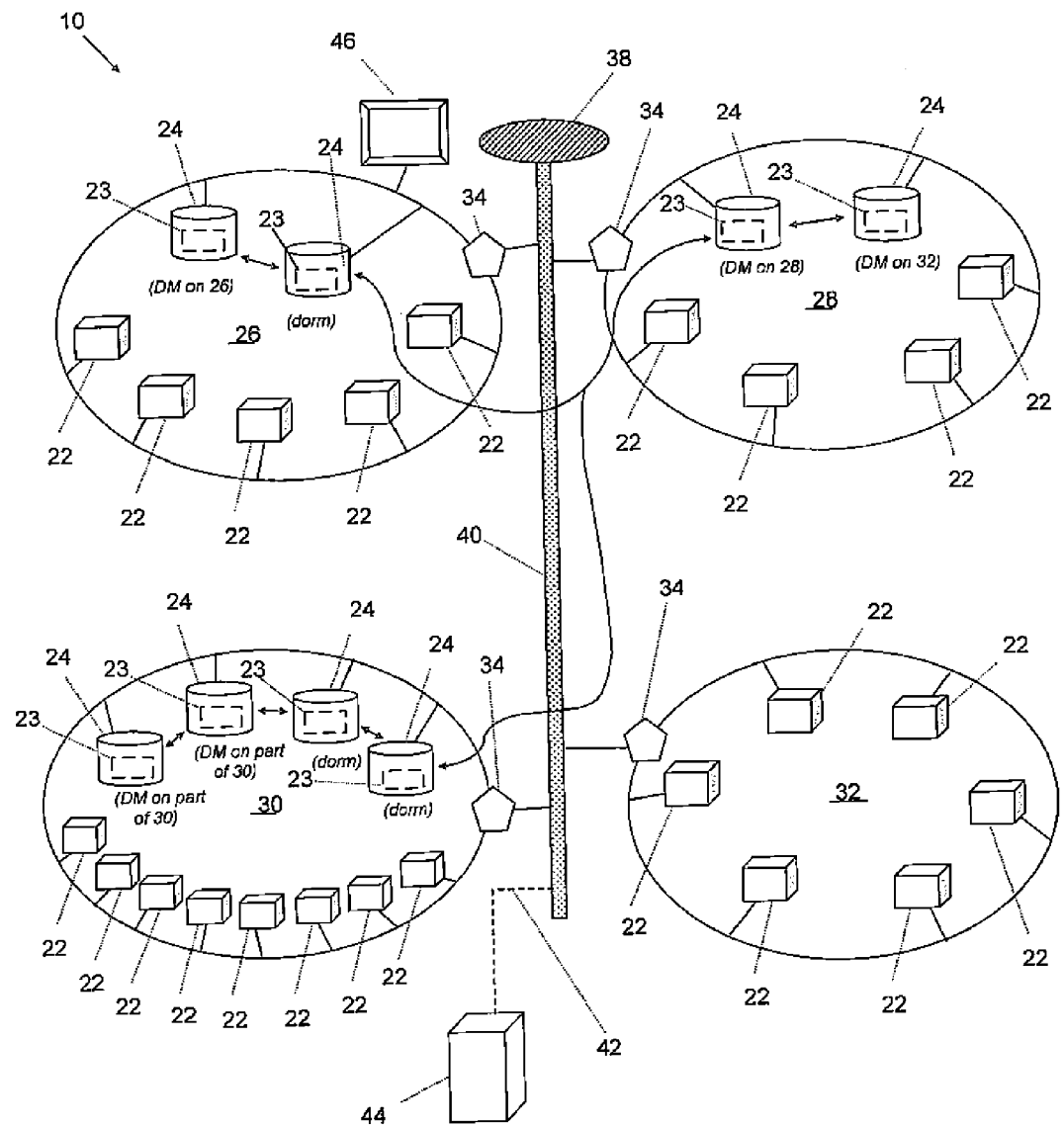
FIG. 1 is a schematic view of a network in which the novel monitoring method and system may be implemented.

FIG. 1 is a schematic view of a network 10 in which the novel monitoring method and system is implemented, according to an embodiment. Network 10 is a local area network (LAN) in this embodiment that comprises a plurality of interconnected network devices including printers 22 and printers 24. Printers 24 are distinguished from printers 22 in that printers 24 comprise network monitors thereon, whereas printers 22 do not. According to this embodiment, the network monitors are embodied as monitoring software that has been flashed onto a persistent storage device residing on printer 24 and therefore embedded. In this embodiment, printers 24 each comprise a device controller underlying an Embedded Virtual Machine (JVM). A Device Software Development Kit (SDK) framework provided by the manufacturer of printer 24 facilitates programmatic access to the JVM, and is employed, by software code flashed onto the printer 24 to programmatically access the JVM for providing monitoring functionality, as will be described in further detail.

Printers 22 and 24 are arranged into subnets 26,28,30, and 32, and each of subnets 26, 28, 30, and 32 is connected through a network switch 34 to a network backbone 40. Network backbone 40 is administered by a network router 38, and provides access via internet connection 42 to an external collector 44 that stores information gathered by each printer 24. Network 10 also comprises a display 46 that allows the status of printers 22 and 24 to be viewed by a network administrator or other user.

Communication between printers 24 within network 10 is performed via SOAP (Simple Object Access Protocol) or raw XML over TCP/IP. These network communications are handled by a web services instrument also embedded on each printer 24.

The monitoring software embedded into each of printers 24 provides network discovery, monitoring and reporting capability to a user of network 10 with little or no configuration as will be described.

Figure 2:
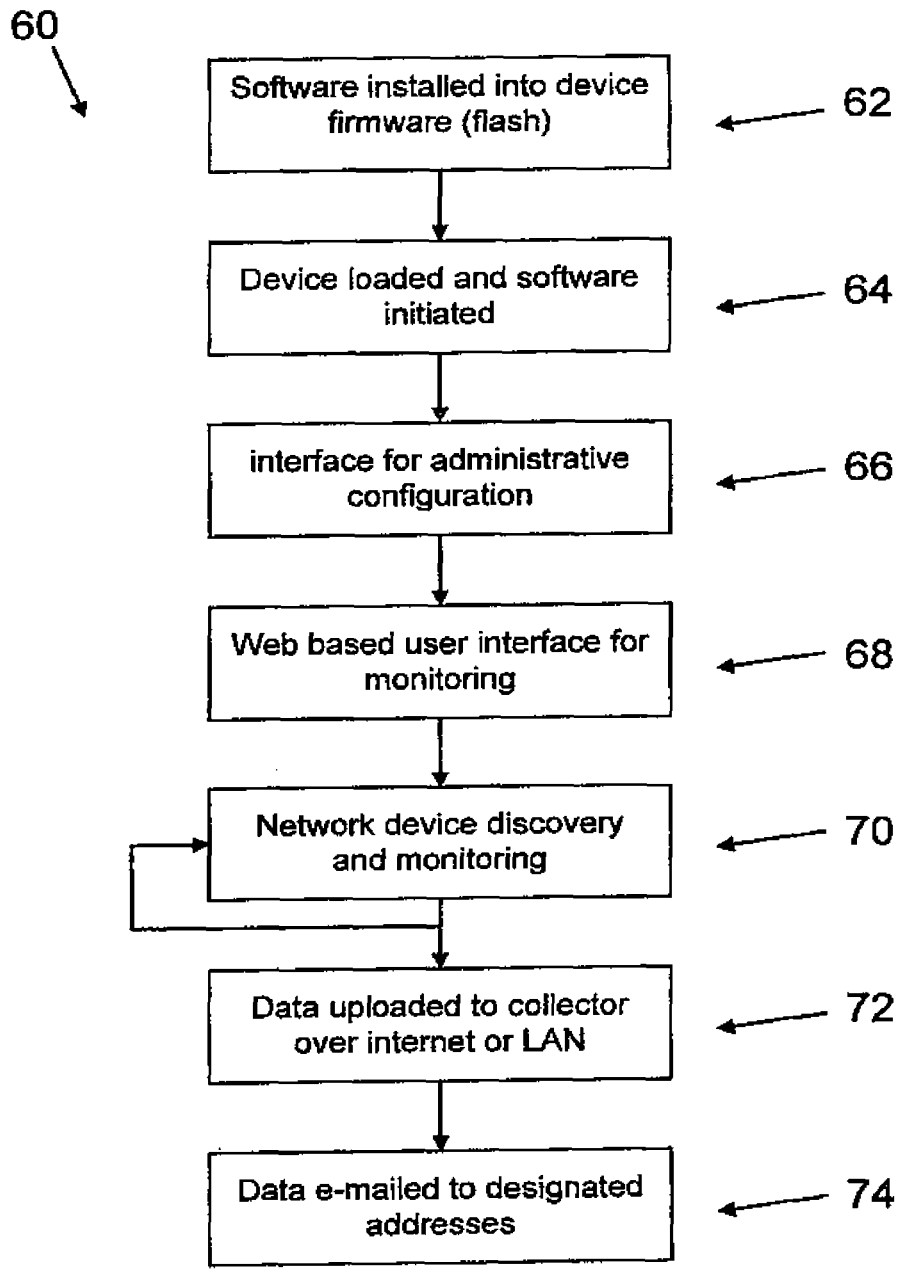
FIG. 2 is a flowchart showing steps in the monitoring method.

FIG. 2 is a flowchart of the monitoring method 60 carried out by the 30 monitoring software embedded in printers 24. First, as shown in step 62, a software bundle including the monitoring software is installed as firmware onto printer 24. In this embodiment, the firmware is flashed onto EEPROM or other persistent storage device residing on printer 24, prior to delivery to the end user. Next, in step 64, the printer 24 loads and initiates the software bundle. In step 66, the software bundle provides an administrative interface for configuration of control parameters. This configuration is only required for changes at the administrative level, as the software is designed by default to perform its functions with no configuration by the user. In step 68, the monitoring software being run provides a web-based user interface that provides access to monitoring information, such as: a) operational status; b) a list of printers 22 and 24 discovered and being monitored; and c) a detailed display of the printers 22 and 24 discovered and are being monitored. In step 70, the monitoring software initiates network device discovery and monitoring. This step comprises searching network 10 for printers 22 and 24 thereby, discovering printers 22, 24 and subsequently monitoring-printers 22, 24. In step 72, information collected during the discovery and monitoring steps is uploaded to external collector 44 through internet connection 42. In step 72, portions of the information collected are sent to designated e-mail addresses on a regular and scheduled basis as reports.

During provision of the administrative interface (step 66), a number of administrative control parameters may be defined at the administrative level, such as by an administrator of network 10, to provide customized monitoring functionality. These control parameters may include, for example, but are not limited to: company name; contact name; contact phone number; e-mail address; company address; company identifier code; company site location; collector TCP/IP address; collector TCP/IP port; collector schedule; enable collector; local subnet search range; SNMP community; SNMP discovery timeout; SNMP poll timeout; device discovery schedule; device poll schedule; alert notification e-mail recipients; alert notification instructions; report e-mail recipients; and report e-mail schedule.

With multiple network devices monitoring printing devices on a computer network, an innovative method for continuously monitoring network devices is provided. The method carries out the functions of, among others: a) ensuring monitoring continues if a network device containing embedded instructions is removed from the network, turned off, moved, swapped out, or otherwise permanently removed from the network for a significant period of time; b) distributing work load across multiple devices; c) reducing the impact of the requests on the network; d) sharing information between multiple devices containing embedded instructions; and e) co-ordinating rollup to an external collector with the other devices containing embedded instructions.

The principles of the method performed by the monitoring software will now be described in more detail. Each of subnets 26, 28, 30, and 32 has assigned at most one printer 24 that serves as a designated master ("DM" in FIG. 1). Each DM co-ordinates the roles of other printers 24 in network 10. More particularly, each DM coordinates collection of device information by printers 24, decides which printers 22 and 24 are monitored by each printer 24, counts and tracks the number of printers 22 and 24 being monitored by each printer 24; configures subnet searches; communicates with other printers 24 within the subnet; communicates with the DMs of other subnets; redistributes the tasks of collecting information previously performed by a printer 24 that has ceased to be operational; collects historical information and ensures that the historical information is retained and associated with the appropriate printer 22 or 24; and coordinates the forwarding of collected information to external collector 44.

When a printer 24 initially connects to network 10 and is activated, the discovery process is automatically initiated within the configured subnet search range. If the printer 24 encounters another printer 24, a cooperative process is initiated through the exchange of information between the two printers 24 via the web services. The information exchanged may include, for example, but is not limited to, configurable parameters such as: IP subnet range being monitored; number of printers 22 and 24 currently discovered and monitored; time and date of initial execution of instructions; company information; company codes; TCP/IP address and port destinations of external collector 44; any other configurable parameters. In addition, the information exchanged also includes the subnet DM, if one exists; a list of all other discovered printers 24 on network 10 that are tagged as either active or dormant; and IP ranges to be monitored on network 10, if available.

The DM of a subset evaluates the information exchanged and determines the IP range that each printer 24 should monitor in order to facilitate load sharing. If upon connection new printer 24 to LAN a DM already exists, the new printer 24 initiates communications with the DM via web services. If no DM exists; the new printer 24 automatically assigns itself as the DM for the subnet.

The DM may instruct another printer 24 to remain dormant (i.e. to not discover/monitor) based upon the number of printers 22, 24 discovered and load sharing definitions. These parameters are internally defined based on the minimum number and maximum number of printers 22 and 24 that a printer 24 can manage. For example, in FIG. 1, the printer 24 labeled "dorm" has been rendered dormant by the DM of subnet 26 (labeled "DM of 26"). Should the total number of printers 22, 24 on system 10 increase above a predetermined amount at a future time, the DM will assign a dormant printer 24 an IP range to monitor, and instruct that printer 24 to come out of dormancy and become active.

In the event that a DM becomes unavailable for a predetermined period of time, a new DM is assigned. As the DM communicates with other printers 24 via web services on a scheduled basis, if a scheduled communication is missed, a subordinate printer 24 attempts to communicate with the designated master. If the subordinate printer 24 cannot contact the designated master, the subordinate printer 24 automatically assigns itself as the new DM.

Should a printer 24 be no longer required to collect information, the information previously collected is uploaded to external collector 44, and is discarded from the printer 24 in question.

The DM of a subnet communicates with the DMs of other subnets on a scheduled basis via web services to maintain a list of active DMs and to ensure that the configured network IP ranges continue to be monitored.

During monitoring, at regular and scheduled intervals, the monitored devices are re-interrogated to receive updates on their stored parameters and to check for status and supply changes.

Some examples of information monitored by monitoring printer 24 may include, but are not limited to: printing device identifier; device manufacturer; printing device model; printing device serial number; network address of the printing device; printing device description; printing device location; printing device technology; system name; MAC address; printing device last poll time; printing device last discovery time; printer ports; port type; life-time meter read of the printing device; mono meter read of the printing device; color meter read of the printing device; printer pages meter read; fax pages meter read; copy pages meter read; list pages meter read; life-time scan meter read; fax scan meter read; copy scan meter read; scan to network processor meter read; email scan meter read; oversize printer meter read; volumes over a specified time interval; device status; status description; printer inputs capacity; printer inputs status; printer inputs descriptions; printer inputs media; printer inputs size; printer outputs descriptions; printer outputs capacity; printer outputs units; printer outputs page; printer outputs status; printer covers descriptions; printer covers status; toner coverage read; low paper indicator; no paper indicator; low toner indicator; no toner indicator; door open indicator; jammed indicator; offline indicator; and service indicator.

This collected information is uploaded to external collector 44 on a scheduled basis, and is also retained on the monitoring printer 24 for a pre-defined period which, in this embodiment, is one month.

Where there are multiple monitoring printers 24, the cooperative scheduling of monitoring activities by printers 24 is organized to reduce the number of simultaneous requests sent along network 10, in order to reduce the traffic on network backbone 40, thus reducing the impact of the monitoring method on the network 10. Unless a given subnet cannot be monitored from within, the discovery and monitoring of printers 22, 24 from outside of the given subnet is restricted. Each DM is instructed to equalize the number of printers 22 monitored and the subnet search range, within a given tolerance, monitored by printers 24. The plurality of DMs compares the total number of printers 22,24 monitored under management to ensure that each group of monitoring printers 24 managed by a DM is monitoring an equitable number of printers 22, 24. As the number of managing printers 24 changes, the number of printers 22 and 24 that are monitored by each printer 24 is dynamically changed accordingly. If the number of printers 22, 24 being monitored by a monitoring printer 24 is below a threshold number, the DM may cause the printer 24 to become dormant. If the number of printers 22, 24 being monitored by a monitoring printer 24 is above a threshold number, the DM may cause a dormant printer 24 to become active and assign it monitoring activities.

Any browser connected to network 10 may view the information monitored by any printer 24 by entering the IF address of the printer 24 in the browser window, and selecting the embedded solution on the device. Because of dynamic monitoring, the printers 22, 24 being monitored by a specific monitoring printer 24 may change from one viewing to the next.

The embedded solution lists on a web page all of the printers 24 on network 10 which are monitoring other printers 22, 24. By selecting any printer 24 on the list, the viewer can connect to the printer 24 and display all of the printers 22, 24 being monitored by that printer 24.

From the web page of the embedded solution on any printer 24, a consolidating activity may be initiated by selecting a "display network devices" button or link. The printer 24 in response requests and collects monitoring information from all of the printers 24 via web services as described above. The information is then made to populate another page dynamically.

The DM passes the collected parameters to all printers 24 that it oversees. Each printer 24 uploads its monitored information on a scheduled basis to the external collector 44. The IF designation of external collector 44 and collection parameters are configurable, and are managed by the DM.

When a new printer 24 initially connects to network 10, the discovery process initiates using a configured subnet search range. If no subnet search range is configured, the new printer 24 initiates discovery on the entire IF subnet in which the new printer 24 resides. If the printer 24 discovers another printer 24, the cooperative process is initiated through the exchange of information via web services. Any missing information in the new printer 24 is pre-populated from the discovered printer 24. This information includes, for example, but is not limited to: subnet search range, number of devices being monitored, company code, company details, collector address, port and schedule, and list of other printers 24 and their monitoring status.

Once the new printer 24 identifies the DM from information received from any other printer 24, communication via web services is initiated with the DM. The new printer 24 obtains instructions from the DM on whether it should be dormant or active, and IF ranges the new printer 24 should monitor.

If no other printer 24 is encountered, the printer 24 assigns itself as the DM of the subnet.

Periodically, each DM broadcasts to other subnet DMs to indicate it still exists and is operational. This facilitates cooperation of the DMs of all subnets. During this broadcast, information is exchanged to decide and ensure that a) all network IP ranges to be scanned are handled; b) all printers 22, 24 are being monitored; c) missing information is shared; d) list of DMs and printers 24 are compiled and compared; e) the monitoring workload is shared; f) a DM is reassigned if the current DM of any subnet is deemed unavailable; and g) upload information parameters are exchanged and synchronized.

Printers 24 may disappear (i.e. become unavailable) temporarily from network 10 as a result of various activities (e.g. offline, out of paper, maintenance, etc.). Additionally, printers 24 may be permanently or semi-permanently disconnected from network 10 as a result of activities such as retirement, removal for repair, replacement/swapping out, or movement to another IP location. The monitoring method accounts for the IP range and those printers 22,24 a non-available printer 24 had been monitoring.

To address the temporary unavailability, when a first printer 24 no longer locates a second printer 24, the first printer 24 waits for a fixed period of time before reattempting communications via web services. Should the second printer 24 still be unavailable, the second printer 24 is labeled retired and this information is communicated to the DM via web services. The DM reviews the IP range assignments and reallocates IP ranges to ensure that the printers 22, 24 previously monitored by the second printer 24 will be monitored by another printer 24.

When a printer 24 that had disappeared subsequently reappears, the DM brings the printer 24 out of retirement, and reassigns IP ranges based on the amount of information. The printer 24 is then treated in a similar manner as a newly connected printer 24.

Should any printer 24 no, longer be required to collect information from a printer 22,24, the previously-connected information is uploaded to external collector 44, and discarded from the printer 24.

Printers 22, 24 can be uniquely tracked using the parameters of IP address, device serial number (which is not necessarily unique), and MAC address.

Printers 22, 24 may frequently disappear temporarily from the network as a result of various activities such as being placed offline, out of paper, under repair, replacing consumables, shut off, maintenance, and other activities. In addition, device tracking identification parameters on record may be affected by a newly discovered printer 22, 24 at an IP address previously associated with another printer 22, 24 (the "swapped device") and a previously discovered printer 22,24 at a new IP address (the "moved device"). The following sets up how a specific-printer 22,24 is continued to be tracked and monitored at any location on the network 10.

When a printer 22,24 is moved or removed temporarily, the historical information that is monitored for that device is retained in the monitoring printer 24 responsible for it. After a specified time where the moved or temporarily removed printer 22 or 24 is not found during monitoring, the printer 22, 24 is assigned as retired and eventually discarded.

If the moved or temporarily removed printer 22 or 24 reappears with identical identifying parameters, the retired assignment is removed and the historical information is re-associated with the reappearing printer 22 or 24. If the printer 22 or 24 reappears at a different IP address (the "moved device"), the historical information of the printer 22 or 24 at the old IP address is transferred by the collector to the same printer 22 or 24 at the new address. If a printer 22 or 24 with a new serial number and MAC address appears at the IP address (the "swapped device") and that printer 22 or 24 is not associated with any other IP address, that printer 22 or 24 becomes a "new device".

If the subnet search range includes IP addresses outside the subnet where the DM resides, that search range is included with the monitoring ranges for each printer 24. A printer 24 can therefore be assigned to monitor an external subnet, as illustrated in FIG. 1 for printer 24 labeled "DM of 32" in subnet 28.

The monitoring method includes rules for the DM to decide how IP 30 ranges across multiple subnets are to be monitored. These rules are on: a) the set of IP ranges; b) the number of printers 24; and c) the number of printers 22, 24 being monitored.

An e-mail notification may be sent to a specific e-mail recipient or recipients when an identified status condition changes, or when an alert condition is satisfied. The alert text and designated e-mail recipients are configurable.

Status change information is uploaded to the external collector for processing any error condition, in order to facilitate instructions for follow-up activities.

Printers 22, 24 may be capable of generating multiple status changes, for a single event. Some examples of multiple concurrent status changes include: a) printer down, service requested and unable to connect to printer, and b) jam, door open, cover open, and offline events. The monitoring software creates and sends a single e-mail to notify a recipient or recipients of the multiple concurrent events, or sends multiple e-mails within a fixed time interval.

A printer 22 or 24 does not generally issue a notification, indicating that an event has been rectified. Instead, alerts for events that are important for managing network printers are closed once acknowledged. These important events include: low paper or out of paper, toner low or out, paper jam, device down, and service, requested. The alert is marked closed when the printer status is online, standby, printing, or idle. Toner alerts are uniquely handled according to an anti-shake algorithm, as described below.

Manufacturers of printing devices employ a vast number of ways to determine the level of ink and toner remaining in the cartridge, including algorithms based on page count and ink coverage assumptions. Many printing devices provide toner level information that is approximate, estimated, and therefore simply inaccurate. In addition, users may shake a toner cartridge or bump a printing device which could cause a toner level to change from "low" to "good". In addition, some toner level sensors are known to occasionally stick at specific levels, causing inaccurate toner level readings. For these reasons, status of a toner or ink cartridge may fluctuate dramatically between "toner low" and "toner good", causing the generation of numerous false alerts. The false alerts may in turn cause false notification e-mails, resulting in the delivery of toner unnecessarily.

A toner tracking algorithm, or "anti-shake algorithm" as described below reduces false toner "low" and toner "out" alerts precipitated by shaking of toner cartridges or imprecise information from a printer. In general, the algorithm tracks pages printed between status changes, and employs this information to reduce the number of false toner out and low toner alerts. The particular thresholds employed by the anti-shake algorithm are particular to the manufacturer and model of the printing device.

During the anti-shake algorithm, a toner status change that would signal an alert is checked for. In the event that there is not such a toner status change; the algorithm is terminated. In the event that there is such a toner status change, page counts previously received for previous toner "out" alerts and previous toner "low" alerts are determined. The current page count of the printer is then determined, and all page counts are confirmed as valid if it has been determined that they have not been corrupted by "bad" printer, printer swap, or similar issue.

In the event that valid page counts are not provided, the algorithm is terminated. Otherwise, in the event that the toner is "out"; and the page count difference from the previous toner "out" alert is within an acceptable tolerance, and there is only one toiler cartridge in the printer, then sending of an alert is suppressed. Furthermore, if the toner is "low" and the page count difference, from the previous toner "low" alert or previous toner "out" alert is within an acceptable tolerance, and there is only one toner cartridge in the printer, then sending of an alert is suppressed.

In the event that neither of the two conditions set out above are satisfied, a toner alert is then sent, and the previous toner "low" page count or previous toner "out" page count is updated, as appropriate.

In addition to its functions as described above, the external collector 44 calculates energy consumption of a printer 22, 24 using the device status historical information and the manufacturer's specified energy consumptions for the various states of the printer 22 or 24. Based on historical information status change alerts of the device, the hours spent in each of the device states (e.g. down, standby, idle, and active) are calculated over a specified time interval. This time interval is preferably one month, but may be another time period as desired. Energy consumption is calculated based partly on the printer manufacturer's specifications.

While the above has been described with reference to network devices, that are printers, it may be appreciated that the principles set forth above may be applied to other types of network devices connected to or used with a network, such as, for example: multifunction peripheral/printer (MFP), scanners, plotters, disk drives, tape drives, microphones, speakers, and cameras.

While the above embodiments have been described with reference to printers, it may be appreciated that the printers may be any kind of printer, such as, for example, a multifunction printer, or any other printer.

While the external collector 44 may be external with respect to the immediate spatial or geographical domain of the network, according to an alternative embodiment the collector may be located within the immediate spatial or geographical domain (i.e. not strictly "external"), and may be accessible by either internet or intranet connection.

The network may be a network of any form, such as a local area network (LAN) or a wide-area network (WAN). Accordingly, in other embodiments; the network referred to in the above embodiment may be any form of network comprising networked devices.

Although embodiments have been described above with reference to the accompanying drawings, those of skill in the art will appreciate that variations and modifications may be made without departing from the spirit and scope thereof as defined by the appended claims.

What is claimed is:

1. A method for monitoring a plurality of network devices, comprising: identifying devices on the network making an SNMP connection; requesting identification data from each of the identified devices, wherein the requesting uses one or more of SNMP, HTTP, XML, ICMP, and PJL over TCP/IP; storing the device identification data received in response to requesting; periodically requesting additional data from devices using the stored device identification data and; if the additional data satisfies a predetermined criterion, the predetermined criterion being a configurable parameter and based on a device status change, then creating and sending an electronic message to at least one specified recipient; connecting directly into any identified external device; and forwarding information collected on a scheduled basis to an external collector; wherein all of the steps are performed based on instructions embedded within at least one network device and wherein instructions for interpreting the device status change eliminate duplicate, repetitive and multiple device status changes so as to reduce the sending of electronic messages.

2. The method of claim 1, wherein the storing comprises storing the device identification data on the at least one network device having embedded instructions.

3. The method of claim 1, wherein the external collector is an external server-based data collector.

4. The method of claim 1, wherein the additional data comprises at least one of printing device identifier, device manufacturer, printing device model, printing device serial number, network address of the printing device, printing device description, printing device location, printing device technology, system name, MAC address, printing device last poll time, printing device last discovery time, printer ports, port type, life-time meter read of the printing device, mono meter read of the printing device, color meter read of the printing device, printer pages meter read, fax pages meter read, copy pages meter read, list pages meter read, life-time scan meter read, fax scan meter read, copy scan meter read, scan to network processor meter read, email scan meter read, oversize printer meter read, volumes over a specified time interval, device status, status description, printer inputs capacity, printer inputs status, printer inputs descriptions, printer inputs media, printer inputs size, printer outputs descriptions, printer outputs capacity, printer outputs units, printer outputs page, printer outputs status, printer covers descriptions, printer covers status, toner coverage read, low paper indicator, no paper indicator, low toner indicator, no toner indicator, door open indicator, jammed indicator, offline indicator, service indicator.

5. The method of claim 1, wherein the periodically requesting is carried out at a specified frequency.

6. The method of claim 1, further comprising coordinating the identifying and the requesting of multiple monitoring systems on the network.

7. The method of claim 1, wherein the device identification data and the additional data stored within the at least one network device having embedded instructions are viewable through a browser on the network.

8. The method of claim 1, wherein the configurable parameter is configurable through a browser on the network.

9. The method of claim 1, wherein at least one of the identified devices may be directly accessed from a web page of the at least one device having embedded instructions.

10. The method of claim 1, further comprising the step of retaining historical information of an identified device and, in an event of an IP location change of the identified device, associating the historical information with the identified device.

11. A non-transitory computer readable medium having stored thereon computer readable program code executable by a network device for performing the method of claim 1.

12. The method of claim 1, wherein the devices on the network comprise a printer.

13. A method for monitoring a plurality of network devices, comprising: identifying devices on the network making an SNMP connection; requesting identification data from each of the identified devices, wherein the requesting uses one or more of SNMP, HTTP, XML, ICMP, and PJL over TCP/IP; storing the device identification data received in response to the requesting; periodically requesting additional data from devices using the stored device identification data and, if the additional data satisfies a predetermined criterion, the predetermined criterion being a configurable parameter and based on a device status change, then creating and sending an electronic message to at least one specified recipient; connecting directly into any identified external device; and forwarding information collected on a scheduled basis to an external collector; wherein all of the steps are performed based on instructions embedded within at least one network device and wherein instructions for interpreting the device status change automatically dose an event that has been rectified and which has no accompanying status change indicator.

14. The method of claim 13, wherein the storing comprises storing the device identification data on the at least one network device having embedded instructions.

15. The method of claim 13, wherein the external collector is an external server-based data collector.

16. The method of claim 13, wherein the periodically requesting is carried out at a specified frequency.

17. The method of claim 13, wherein the device identification data and the additional data stored within the at least one network device having embedded instructions are viewable through a browser on the network.

18. The method of claim 13, wherein the configurable parameter is configurable through a browser on the network.

19. The method of claim 13, wherein at least one of the identified devices may be directly accessed from a web page of the at least one device having embedded instructions.

20. The method of claim 13, further comprising the step of retaining historical information of an identified device and, in an event of an IP location change of the identified device, associating the historical information with the identified device.

* * * * *